(12) United States Patent
Sharma

(10) Patent No.: US 12,183,100 B2
(45) Date of Patent: Dec. 31, 2024

(54) SYSTEM AND METHOD FOR GENERATING BEST POTENTIAL RECTIFIED DATA BASED ON PAST RECORDINGS OF DATA

(71) Applicant: JPMorgan Chase Bank, N.A., New York, NY (US)

(72) Inventor: Aditya Sharma, Thane (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 357 days.

(21) Appl. No.: 17/653,999

(22) Filed: Mar. 8, 2022

(65) Prior Publication Data
US 2023/0237822 A1 Jul. 27, 2023

(30) Foreign Application Priority Data
Jan. 22, 2022 (IN) .............................. 202211003689

(51) Int. Cl.
*G06V 30/12* (2022.01)
*G06F 3/04817* (2022.01)
*G06F 3/0482* (2013.01)
*G06F 40/166* (2020.01)
*G06N 20/00* (2019.01)
*G06V 10/94* (2022.01)
(Continued)

(52) U.S. Cl.
CPC ........ *G06V 30/133* (2022.01); *G06F 3/04817* (2013.01); *G06F 3/0482* (2013.01); *G06F 40/166* (2020.01); *G06N 20/00* (2019.01); *G06V 10/945* (2022.01); *G06V 30/19133* (2022.01); *G06V 30/1916* (2022.01); *G06V 30/26* (2022.01); *G06V 30/41* (2022.01)

(58) Field of Classification Search
CPC ............... G06V 30/133; G06V 10/945; G06V 30/19133; G06V 30/1916; G06V 30/26; G06V 30/41; G06V 30/127; G06V 30/262; G06F 3/04817; G06F 3/0482; G06F 40/166; G06N 20/00
USPC .......................................................... 382/311
See application file for complete search history.

(56) References Cited

U.S. PATENT DOCUMENTS 6,324,534 B1 * 11/2001 Neal .................... G06F 16/951
                                                        709/224
6,421,675 B1 * 7/2002 Ryan ...................... G06F 16/30
(Continued)

*Primary Examiner* — Negussie Worku
(74) *Attorney, Agent, or Firm* — GREENBLUM & BERNSTEIN, P.L.C.

(57) ABSTRACT

Various methods, apparatuses/systems, and media for data processing are disclosed. A processor receives a digital document; applies an optical character recognition (OCR) algorithm on said received digital document by utilizing an OCR tool; identifies defective data extracted by the OCR tool resulted from relatively inferior image quality of the received digital document; implements an auto rectification algorithm on the identified defective data; automatically generates, in response to implementing the auto rectification algorithm, corresponding auto-rectified data for each identified defective data; records the defective data and corresponding auto-rectified data at a field level; receives user input data on said recorded auto-rectified data; determines whether the auto-rectified data is correct or not; and populates, based on determining that the auto-rectified data is correct, a machine learning model with said received user input data to be utilized for subsequently received digital document.

18 Claims, 13 Drawing Sheets

(51) Int. Cl.
*G06V 30/19* (2022.01)
*G06V 30/26* (2022.01)
*G06V 30/41* (2022.01)

(56) References Cited

U.S. PATENT DOCUMENTS

| | | | | |
|---|---|---|---|---|
| 7,499,588 | B2 * | 3/2009 | Jacobs | G06V 30/153 |
| | | | | 382/229 |
| 8,249,399 | B2 * | 8/2012 | Barkan | G06V 10/987 |
| | | | | 382/229 |
| 11,257,006 | B1 * | 2/2022 | Anschel | G06N 20/00 |
| 11,341,605 | B1 * | 5/2022 | Singh | H04L 67/1095 |
| 11,481,683 | B1 * | 10/2022 | Singh | G06N 5/04 |
| 2008/0059452 | A1 * | 3/2008 | Frank | G06F 16/338 |
| | | | | 707/999.005 |
| 2010/0067794 | A1 * | 3/2010 | Barkan | G06V 10/987 |
| | | | | 382/182 |
| 2014/0153787 | A1 * | 6/2014 | Schmidtler | G06V 30/40 |
| | | | | 382/112 |
| 2019/0102649 | A1 * | 4/2019 | Ackley | G06V 10/809 |
| 2022/0350996 | A1 * | 11/2022 | Jonnalagedda | G06F 18/2163 |
| 2023/0315799 | A1 * | 10/2023 | Belhe | G06F 40/221 |
| | | | | 715/206 |
| 2023/0368556 | A1 * | 11/2023 | Jha | G06V 30/19147 |

\* cited by examiner

FIG. 8

SYSTEM AND METHOD FOR GENERATING BEST POTENTIAL RECTIFIED DATA BASED ON PAST RECORDINGS OF DATA

CROSS-REFERENCE TO RELATED APPLICATIONS

This application claims the benefit of priority from Indian Provisional Patent Application No. 202211003689, filed Jan. 22, 2022, which is herein incorporated by reference in its entirety.

TECHNICAL FIELD

This disclosure generally relates to data processing, and, more particularly, to methods and apparatuses for implementing a smart data capture module that is configured to generate/suggest best potential rectified data based on past recordings of data.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Today, to expedite the data entry process for operations team of any given business process, digitization using OCR (optical character recognition) product may be introduced. OCR solution may extract the data from images and make it available to a user in key/value format. However, due to poor quality of images and documents, erroneous or partial data are often extracted from the images. This may prove to be counter-productive for the data entry team as they have to rectify or retype the data. For example, wrong extraction due to image quality and OCR tools limitation may force developers to continuously refine templates. Also, there is a possibility that a user rectifies the same erroneous data again and again leading to a poor user experience and reducing quality of end work product.

Therefore, there is a need for an advanced tool that can address these conventional shortcomings.

SUMMARY

The present disclosure, through one or more of its various aspects, embodiments, and/or specific features or sub-components, provides, among other features, various systems, servers, devices, methods, media, programs, and platforms for implementing a platform and language agnostic data capture module that is configured to generate/suggest best potential rectified data based on past recordings of data, but the disclosure is not limited thereto. For example, the various aspects, embodiments, features, and/or sub-components may also provide optimized processes of implementing a platform and language agnostic data capture module that is configured to: provide contextual suggestions at a field level (i.e., suggestions for data auto rectification are specific to context and is provided at field level); and provide collaborative suggestions for a field (i.e., when a field is not extracted or not known to the user than the data can be predicted based on the related fields), etc., but the disclosure is not limited thereto.

According to an aspect of the present disclosure, the smart data capture module may be configured to capture data through a user interface (i.e., data manually input by a user) or through a system using optical character recognition tools, but the disclosure is not limited thereto. For example, according to another aspect of the present disclosure, the smart data capture module may be configured to capture data through both a user interface (i.e., data manually input by a user) and through a system using optical character recognition tools.

The data recording files, according to exemplary embodiments, may be written using JSON, but the disclosure is not limited thereto. For example, the data recording files can easily be extended to other readable file formats such as XML, YAML, binary etc., or any other configuration based languages.

According to an aspect of the present disclosure, a method for data processing by utilizing one or more processors along with allocated memory is disclosed. The method may include: receiving a digital document; applying an optical character recognition (OCR) algorithm on said received digital document by utilizing an OCR tool; identifying defective data extracted by the OCR tool resulted from relatively inferior image quality of the received digital document; implementing an auto rectification algorithm on the identified defective data; automatically generating, in response to implementing the auto rectification algorithm, corresponding auto-rectified data for each identified defective data; recording the defective data and corresponding auto-rectified data at a field level; receiving user input data on said recorded auto-rectified data; determining whether the auto-rectified data is correct or not; and populating, based on determining that the auto-rectified data is correct, a machine learning model with said received user input data to be utilized for subsequently received digital document.

According to yet another aspect of the instant disclosure, the defective data may include one or more of the following data: unwanted extraction data, partial data, incomplete data, junk data, and perfect but incomplete extraction data, but the disclosure is not limited thereto.

According to a further aspect of the instant disclosure, the method may further include: generating a plurality of first selectable icons, wherein each of said first selectable icon is configured to display corresponding auto-rectified field data when user input is received by clicking or hovering over the first selectable icon; receiving user input data that the auto-rectified field data is not correct based on user's comparison of the auto-rectified field data with a corresponding original image data of the digital document; and receiving user input data indicating a user defined correct field data replacing the auto-rectified field data.

According to an additional aspect of the instant disclosure, the method may further include receiving user input data indicating approval of the auto-rectified field data when a difference between an auto-rectified data value and user input data value is equal to or more than a predetermined threshold value.

According to yet another aspect of the instant disclosure, the method may further include receiving user input data indicating disapproval of the auto-rectified field data when a difference between an auto-rectified data value and user input data value is below a predetermined threshold value.

According to yet another aspect of the instant disclosure, the method may further include: generating a plurality of second selectable icons, wherein each of said second selectable icon is configured to display, upon receiving user input via clicking or hovering over the second selectable icon, corresponding suggested potential match field data for a corresponding disapproval of the auto-rectified field data based on historical patterns data that was generated previously in correcting the disapproved auto-rectified field data; receiving user input in approving the suggested potential match field data; and populating the machine learning model with said approved suggested potential match field data to be utilized for subsequently received digital document.

According to another aspect of the instant disclosure, wherein when suggested potential match field data is not available for a certain extracted or user populated data, the method may further include: receiving user input data that accepts the certain extracted or the user populated data as a new field data for subsequent suggestions; and populating the machine learning model with said new field data to be utilized for subsequently received digital document.

According to yet another aspect of the present disclosure, the method may further include: providing suggestions to the users based on past recording of the user selected data; and recording the suggestion selected or rejected (by selecting or typing another value) by the user and maintaining a hit count per suggestion. With time, the set of suggestion for a given field will increase and the entire list of suggestion can be ordered based on hit count (likes or dislikes).

According to a further aspect of the present disclosure, to refine the suggestion and reduce the time to identify the best potential match for users' requirement, the method may further perform a cleanup activity. For example, the method may apply a mark and sweep algorithm that may include the following, but the disclosure is not limited thereto. Mark all the suggestions that have low hit counts (i.e., a predetermined threshold value) and keep them for a configurable period of time (configuration can be controlled by user); and sweep/delete all the suggestions which were marked once the configured time has passed. According to an aspect of the present disclosure, the suggestion value gets unmarked for deletion in case it gets used for suggestion or the hit count increases above a certain threshold (threshold is configurable).

According to yet another aspect of the present disclosure, a user of the smart data capture module may be in full control of the data. For example, by utilizing the smart data capture module, a user can enable suggestions for a data field or n number of data field, wherein the smart data capture module is configured to create a background index; reuse suggestion of one data field for other data fields; and disable the suggestions, wherein the smart data capture module is configured to delete the index, etc., but the disclosure is not limited thereto.

According to an aspect of the present disclosure, a system for data processing is disclosed. The system may include: a processor; and a memory operatively connected to the processor via a communication interface, the memory storing computer readable instructions, when executed, may cause the processor to: receive a digital document; apply an optical character recognition (OCR) algorithm on said received digital document by utilizing an OCR tool; identify defective data extracted by the OCR tool resulted from relatively inferior image quality of the received digital document; implement an auto rectification algorithm on the identified defective data; automatically generate, in response to implementing the auto rectification algorithm, corresponding auto-rectified data for each identified defective data; record the defective data and corresponding auto-rectified data at a field level; receive user input data on said recorded auto-rectified data; determine whether the auto-rectified data is correct or not; and populate, based on determining that the auto-rectified data is correct, a machine learning model with said received user input data to be utilized for subsequently received digital document.

According to a further aspect of the instant disclosure, the processor is further configured to: generate a plurality of first selectable icons, wherein each of said first selectable icon is configured to display corresponding auto-rectified field data when user input is received by clicking or hovering over the first selectable icon; receive user input data that the auto-rectified field data is not correct based on user's comparison of the auto-rectified field data with a corresponding original image data of the digital document; and receive user input data indicating a user defined correct field data replacing the auto-rectified field data.

According to an additional aspect of the instant disclosure, the processor is further configured to receive user input data indicating approval of the auto-rectified field data when a difference between an auto-rectified data value and user input data value is equal to or more than a predetermined threshold value.

According to yet another aspect of the instant disclosure, the processor is further configured to receive user input data indicating disapproval of the auto-rectified field data when a difference between an auto-rectified data value and user input data value is below a predetermined threshold value.

According to yet another aspect of the instant disclosure, the processor is further configured to: generate a plurality of second selectable icons, wherein each of said second selectable icon is configured to display, upon receiving user input via clicking or hovering over the second selectable icon, corresponding suggested potential match field data for a corresponding disapproval of the auto-rectified field data based on historical patterns data that was generated previously in correcting the disapproved auto-rectified field data; receive user input in approving the suggested potential match field data; and populate the machine learning model with said approved suggested potential match field data to be utilized for subsequently received digital document.

According to another aspect of the instant disclosure, wherein when suggested potential match field data is not available for a certain extracted or user populated data, the processor is further configured to: receive user input data that accepts the certain extracted or the user populated data as a new field data for subsequent suggestions; and populate the machine learning model with said new field data to be utilized for subsequently received digital document.

According to an aspect of the present disclosure, a non-transitory computer readable medium configured to store instructions for data processing is disclosed. The instructions, when executed, may cause a processor to perform the following: receiving a digital document; applying an optical character recognition (OCR) algorithm on said received digital document by utilizing an OCR tool; identifying defective data extracted by the OCR tool resulted from relatively inferior image quality of the received digital document; implementing an auto rectification algorithm on the identified defective data; automatically generating, in response to implementing the auto rectification algorithm, corresponding auto-rectified data for each identified defective data; recording the defective data and corresponding auto-rectified data at a field level; receiving user input data on said recorded auto-rectified data; determining whether the auto-rectified data is correct or not; and populating, based on determining that the auto-rectified data is correct, a machine learning model with said received user input data to be utilized for subsequently received digital document.

According to a further aspect of the instant disclosure, the instructions, when executed, may cause the processor to further perform the following: generating a plurality of first selectable icons, wherein each of said first selectable icon is configured to display corresponding auto-rectified field data when user input is received by clicking or hovering over the first selectable icon; receiving user input data that the auto-rectified field data is not correct based on user's comparison of the auto-rectified field data with a corresponding original image data of the digital document; and receiving user input data indicating a user defined correct field data replacing the auto-rectified field data.

According to an additional aspect of the instant disclosure, the instructions, when executed, may cause the processor to further perform the following: receiving user input data indicating approval of the auto-rectified field data when a difference between an auto-rectified data value and user input data value is equal to or more than a predetermined threshold value.

According to yet another aspect of the instant disclosure, the instructions, when executed, may cause the processor to further perform the following: receiving user input data indicating disapproval of the auto-rectified field data when a difference between an auto-rectified data value and user input data value is below a predetermined threshold value.

According to yet another aspect of the instant disclosure, the instructions, when executed, may cause the processor to further perform the following: generating a plurality of second selectable icons, wherein each of said second selectable icon is configured to display, upon receiving user input via clicking or hovering over the second selectable icon, corresponding suggested potential match field data for a corresponding disapproval of the auto-rectified field data based on historical patterns data that was generated previously in correcting the disapproved auto-rectified field data; receiving user input in approving the suggested potential match field data; and populating the machine learning model with said approved suggested potential match field data to be utilized for subsequently received digital document.

According to another aspect of the instant disclosure, wherein when suggested potential match field data is not available for a certain extracted or user populated data, the instructions, when executed, may cause the processor to further perform the following: receiving user input data that accepts the certain extracted or the user populated data as a new field data for subsequent suggestions; and populating the machine learning model with said new field data to be utilized for subsequently received digital document.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 8 illustrates an exemplary screen shot that illustrates an auto suggestion algorithm implemented by the platform and language agnostic smart data capture module of FIGS. 4, 5, and 6 in accordance with an exemplary embodiment.

DETAILED DESCRIPTION

Figure 1:
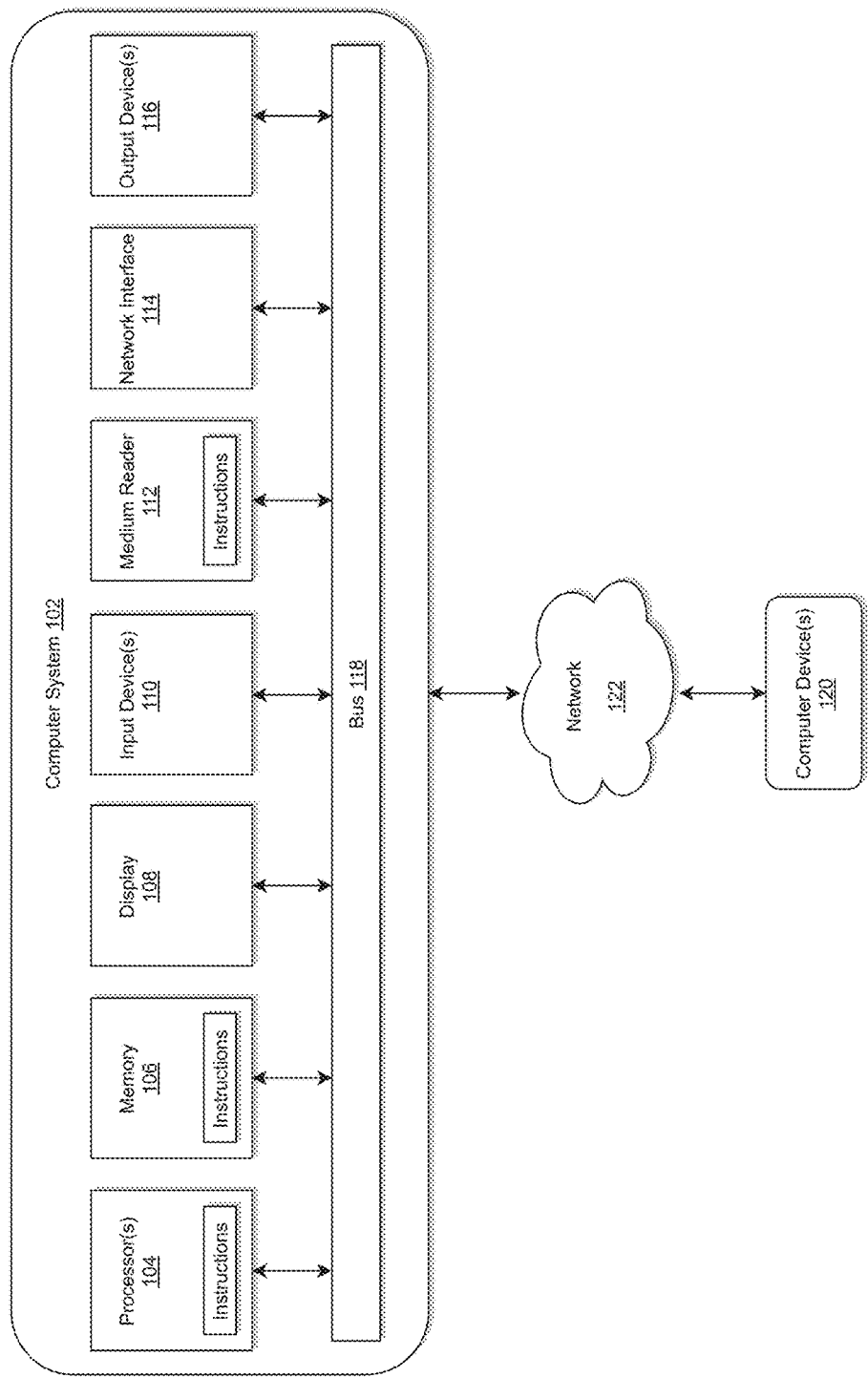
FIG. 1 illustrates a computer system for implementing a platform and language agnostic smart data capture module that is configured to generate/suggest/display best potential rectified data based on past recordings of data in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system for use in implementing a smart data capture module that is configured to generate/suggest best potential rectified data based on past recordings of data in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
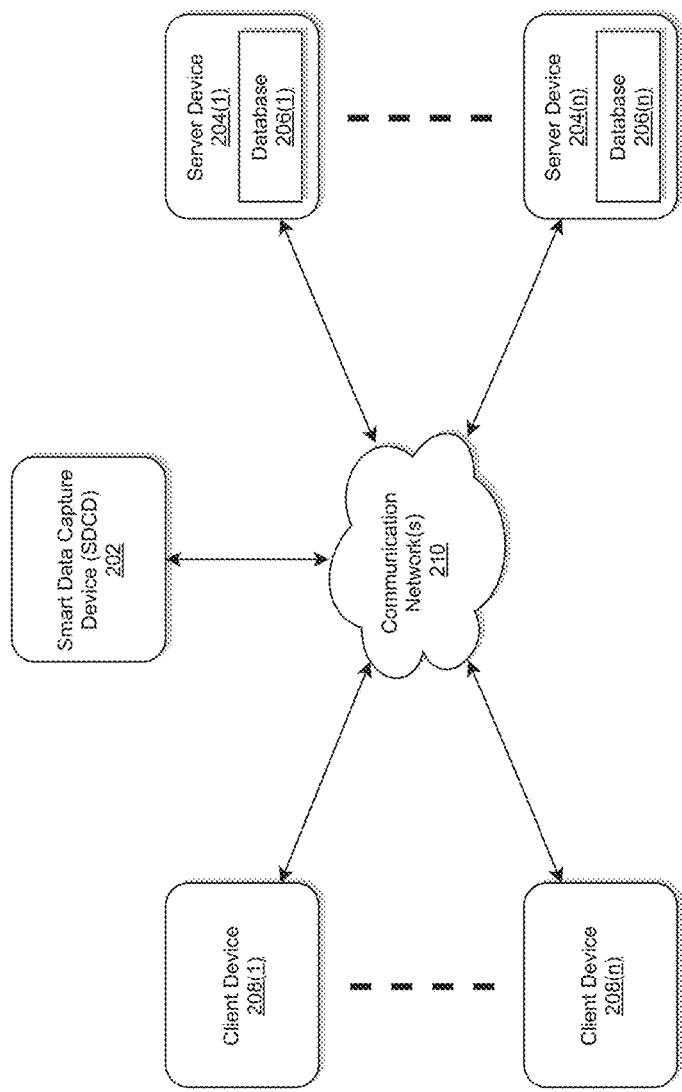
FIG. 2 illustrates an exemplary diagram of a network environment with a platform and language agnostic smart data capture device in accordance with an exemplary embodiment.

Referring to FIG. 2, a schematic of an exemplary network environment 200 for implementing a platform and language agnostic smart data capture device (SDCD) of the instant disclosure is illustrated.

According to exemplary embodiments, the above-described problems associated with conventional approach of data processing may be overcome by implementing an SDCD 202 as illustrated in FIG. 2 that may be configured to generate/suggest best potential rectified data based on past recordings of data. For example, the SDCD 202 may also provide contextual suggestions at a field level (i.e., suggestions for data auto rectification are specific to context and is provided at field level); and provide collaborative suggestions for a field (i.e., when a field is not extracted or not known to the user than the data can be predicted based on the related fields), etc., but the disclosure is not limited thereto.

The SDCD 202 may be the same or similar to the computer system 102 as described with respect to FIG. 1.

The SDCD 202 may store one or more applications that can include executable instructions that, when executed by the SDCD 202, cause the SDCD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the SDCD 202 itself, may be located in virtual server(s) running in a cloud-based computing environment rather than being tied to one or more specific physical network computing devices. Also, the application(s) may be running in one or more virtual machines (VMs) executing on the SDCD 202. Additionally, in one or more embodiments of this technology, virtual machine(s) running on the SDCD 202 may be managed or supervised by a hypervisor.

In the network environment 200 of FIG. 2, the SDCD 202 is coupled to a plurality of server devices 204(1)-204(n) that hosts a plurality of databases 206(1)-206(n), and also to a plurality of client devices 208(1)-208(n) via communication network(s) 210. A communication interface of the SDCD 202, such as the network interface 114 of the computer system 102 of FIG. 1, operatively couples and communicates between the SDCD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the SDCD 202, the server devices 204(1)-204

(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The SDCD 202 may be a standalone device or integrated with one or more other devices or apparatuses, such as one or more of the server devices 204(1)-204(n), for example. In one particular example, the SDCD 202 may be hosted by one of the server devices 204(1)-204(n), and other arrangements are also possible. Moreover, one or more of the devices of the SDCD 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the SDCD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the SDCD 202 that may efficiently provide a platform for implementing a platform and language agnostic smart data capture module that is configured to generate, suggest, display best potential rectified data based on past recordings of data, but the disclosure is not limited thereto. For example, the client devices 208(1)-208(n) in this example may include any type of computing device that can facilitate the implementation of the SDCD 202 that provide optimized processes of implementing a platform and language agnostic data capture module that is configured to: provide contextual suggestions at a field level (i.e., suggestions for data auto rectification are specific to context and is provided at field level); and provide collaborative suggestions for a field (i.e., when a field is not extracted or not known to the user than the data can be predicted based on the related fields), etc., but the disclosure is not limited thereto.

The client devices 208(1)-208(n) may run interface applications, such as standard web browsers or standalone client applications, which may provide an interface to communicate with the SDCD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the SDCD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the SDCD 202, the server devices 204(1)-204(n), or the client devices 208(1)-208(n), for example, may be configured to operate as virtual instances on the same physical machine. For example, one or more of the SDCD 202, the server devices 204(1)-204(n), or the client devices 208(1)-208(n) may operate on the same physical device rather than as separate devices communicating through communication network(s) 210. Additionally, there may be more or fewer SDCDs 202, server devices 204(1)-204(n), or client devices 208(1)-208(n) than illustrated in FIG. 2. According to exemplary embodiments, the SDCD 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
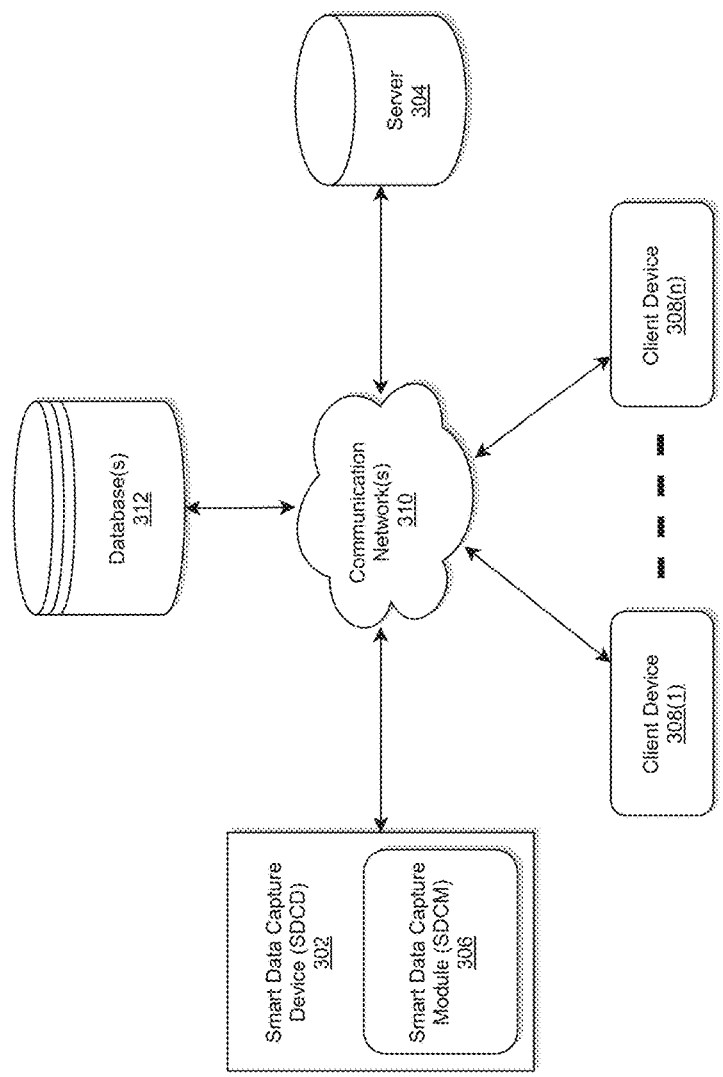
FIG. 3 illustrates a system diagram for implementing a platform and language agnostic smart data capture device having a platform and language agnostic smart data capture module in accordance with an exemplary embodiment.

FIG. 3 illustrates a system diagram for implementing a platform and language agnostic smart data capture device (SDCD) having a platform and language agnostic smart data capture module (SDCM) in accordance with an exemplary embodiment.

As illustrated in FIG. 3, the system 300 may include a SDCD 302 within which a SDCM 306 is embedded, a server 304, a database(s) 312, a plurality of client devices 308(1) ... 308(n), and a communication network 310.

According to exemplary embodiments, the SDCD 302 including the SDCM 306 may be connected to the server 304, and the database(s) 312 via the communication network 310. The SDCD 302 may also be connected to the plurality of client devices 308(1) ... 308(n) via the communication network 310, but the disclosure is not limited thereto.

According to exemplary embodiment, the SDCD 302 is described and shown in FIG. 3 as including the SDCM 306, although it may include other rules, policies, modules, databases, or applications, for example. According to exemplary embodiments, the database(s) 312 may be configured to store ready to use modules written for each API for all environments. Although only one database is illustrated in FIG. 3, the disclosure is not limited thereto. Any number of desired databases may be utilized for use in the disclosed invention herein. The database(s) may be a mainframe database, a log database that may that may produce programming for searching, monitoring, and analyzing machine-generated data via a web interface, etc., but the disclosure is not limited thereto.

According to exemplary embodiments, the SDCM 306 may be configured to receive real-time feed of data from the plurality of client devices 308(1) ... 308(n) via the communication network 310.

As will be described below, the SDCM 306 may be configured to receive a digital document; apply an OCR algorithm on the received digital document by utilizing an OCR tool; identify defective data extracted by the OCR tool resulted from relatively inferior image quality of the received digital document; implement an auto rectification algorithm on the identified defective data; automatically generate, in response to implementing the auto rectification algorithm, corresponding auto-rectified data for each identified defective data; record the defective data and corresponding auto-rectified data at a field level; receive user input data on said recorded auto-rectified data; determine whether the auto-rectified data is correct or not; and populate, based on determining that the auto-rectified data is correct, a machine learning model with said received user input data to be utilized for subsequently received digital document, record all corresponding data onto a database (e.g., database(s) 312), but the disclosure is not limited thereto.

The plurality of client devices 308(1) ... 308(n) are illustrated as being in communication with the SDCD 302. In this regard, the plurality of client devices 308(1) ... 308(n) may be "clients" of the SDCD 302 and are described herein as such. Nevertheless, it is to be known and understood that the plurality of client devices 308(1) ... 308(n) need not necessarily be "clients" of the SDCD 302, or any entity described in association therewith herein. Any additional or alternative relationship may exist between either or both of the plurality of client devices 308(1) ... 308(n) and the SDCD 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) ... 308(n) may communicate with the SDCD 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The SDCD 302 may be the same or similar to the SDCD 202 as described with respect to FIG. 2, including any features or combination of features described with respect thereto.

Figure 4:
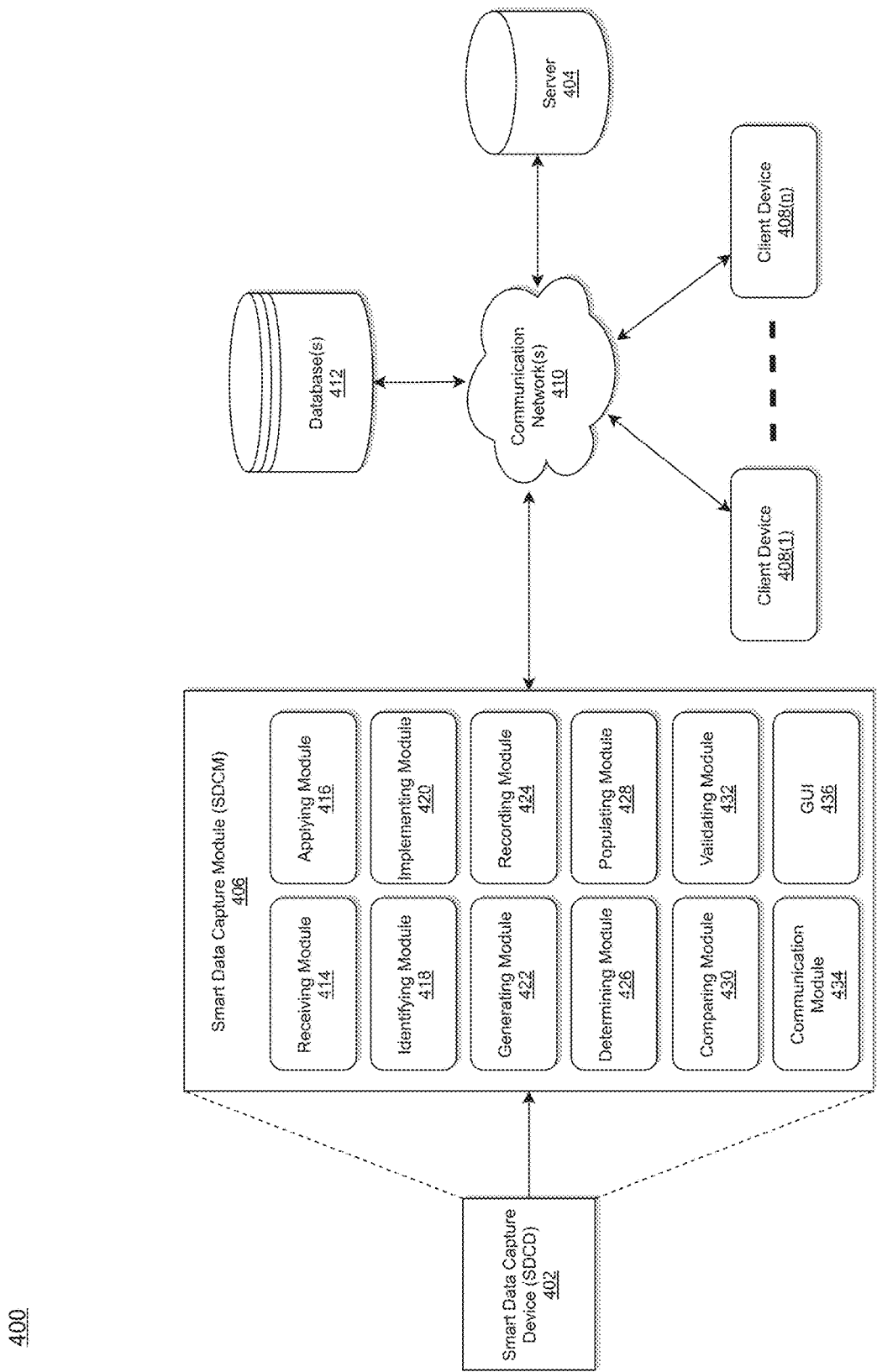
FIG. 4 illustrates a system diagram for implementing a platform and language agnostic smart data capture module of FIG. 3 in accordance with an exemplary embodiment.

FIG. 4 illustrates a system diagram for implementing a platform and language agnostic smart data capture module (SDCM) of FIG. 3 in accordance with an exemplary embodiment.

According to exemplary embodiments, the system 400 may include a platform and language agnostic smart data capture device (SDCD) 402 within which an SDCM 406 is embedded, a server 404, database(s) 412, and a communication network 410.

According to exemplary embodiments, the SDCD 402 including the SDCM 406 may be connected to the server 404 and the database(s) 412 via the communication network 410. The SDCD 402 may also be connected to the plurality of client devices 408(1)-408(n) via the communication network 410, but the disclosure is not limited thereto. The SDCM 406, the server 404, the plurality of client devices 408(1)-408(n), the database(s) 412, the communication network 410 as illustrated in FIG. 4 may be the same or similar to the SDCM 306, the server 304, the plurality of client devices 308(1)-308(n), the database(s) 312, the communication network 310, respectively, as illustrated in FIG. 3.

According to exemplary embodiments, as illustrated in FIG. 4, the SDCM 406 may include an receiving module 414, an applying module 416, a identifying module 418, a implementing module 420, a generating module 422, a recording module 424, a determining module 426, a populating module 428, a comparing module 430, a validating module 432, a communication module 434, and a GUI 436.

According to exemplary embodiments, each of the receiving module 414, applying module 416, identifying module 418, implementing module 420, generating module 422, recording module 424, determining module 426, populating module 428, comparing module 430, validating module 432, and the communication module 434 of the SDCM 406 may be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies.

According to exemplary embodiments, each of the receiving module 414, applying module 416, identifying module 418, implementing module 420, generating module 422, recording module 424, determining module 426, populating module 428, comparing module 430, validating module 432, and the communication module 434 of the SDCM 406 may be implemented by microprocessors or similar, and may be programmed using software (e.g., microcode) to perform various functions discussed herein and may optionally be driven by firmware and/or software.

Alternatively, according to exemplary embodiments, each of the receiving module 414, applying module 416, identifying module 418, implementing module 420, generating module 422, recording module 424, determining module 426, populating module 428, comparing module 430, validating module 432, and the communication module 434 of the SDCM 406 may be implemented by dedicated hardware, or as a combination of dedicated hardware to perform some functions and a processor (e.g., one or more programmed microprocessors and associated circuitry) to perform other functions.

According to exemplary embodiments, each of the receiving module 414, applying module 416, identifying module 418, implementing module 420, generating module 422, recording module 424, determining module 426, populating module 428, comparing module 430, validating module 432, and the communication module 434 of the SDCM 406 may be called via corresponding API.

The process may be executed via the communication module 434 and the communication network 410, which may comprise plural networks as described above. For example, in an exemplary embodiment, the various components of the SDCM 406 may communicate with the server 404, and the database(s) 412 via the communication module 434 and the communication network 410. Of course, these embodiments are merely exemplary and are not limiting or exhaustive.

Figure 5:
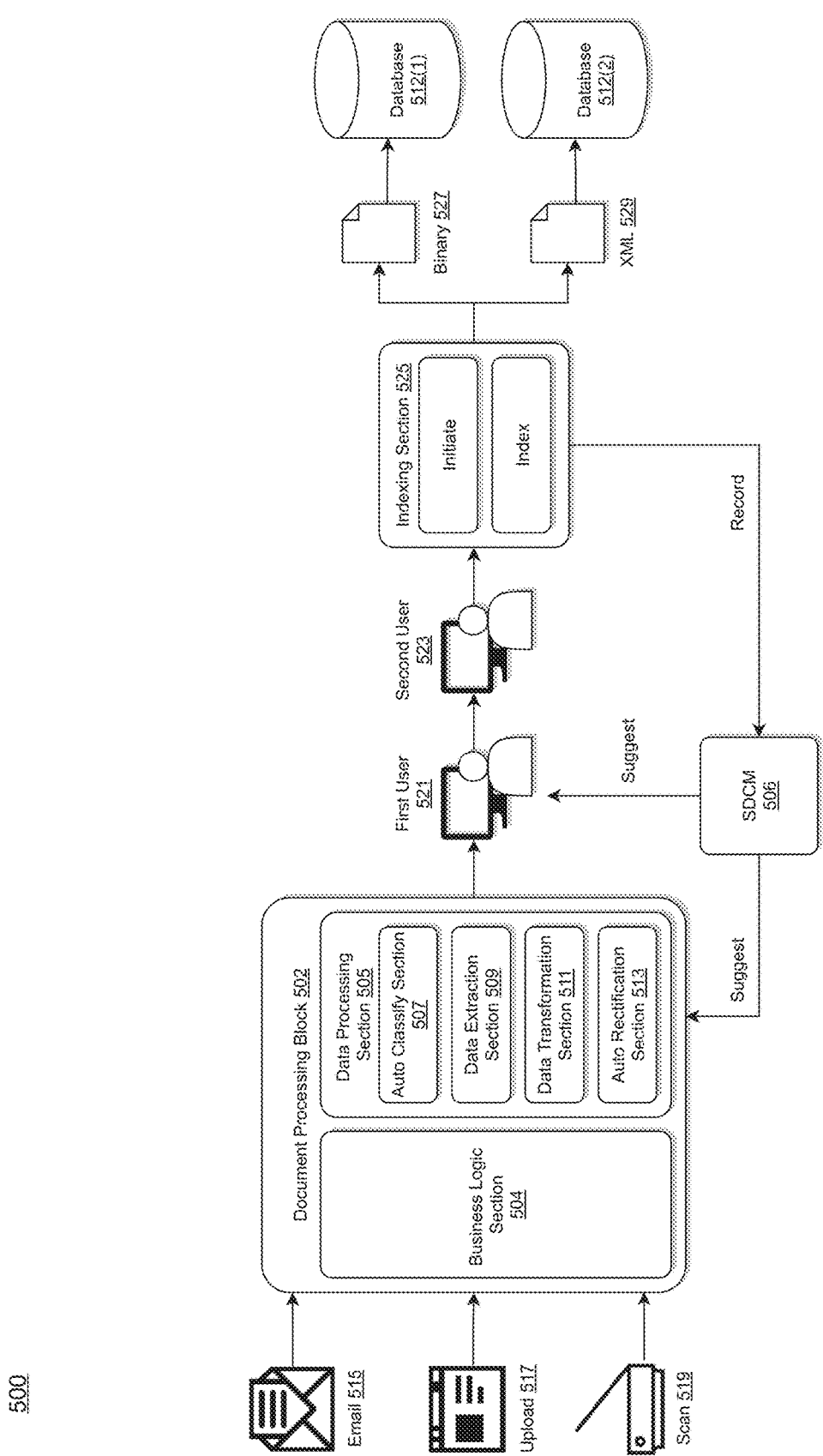
FIG. 5 illustrates another exemplary system that implements a platform and language agnostic smart data capture module of FIG. 4 in accordance with an exemplary embodiment.

FIG. 5 illustrates an exemplary system 500 that implements the SDCM 406 of FIG. 4 in accordance with an exemplary embodiment. As illustrated in FIG. 5, the system 500 may include a document processing block 502 that may include a business logic section 504 and a data processing section 505. The data processing section 505 may include an auto classify section 507, a data extraction section 509, a data transformation section 511, and an auto rectification section 513. The data processing section 505 may be configured to obtain a digital document from a plurality of ways, e.g., via email 515, via upload 517, or via scan 519, but the disclosure is not limited thereto.

As illustrated in FIG. 5, the data processing section 505 may be operatively connected to a smart data capture module (SDCM) 506. The SDCM 506 as illustrated in FIG. 5 may be the same or similar to the SMM 406 as illustrated in FIG. 4, and may include corresponding modules as illustrated in FIG. 4. Data from the data processing section 505 may flow to a computing device operated by a first user 521 (e.g., a maker who corrects a defected data extracted by OCR algorithm), and then the data may flow to another computing device operated by a second user 523 (e.g., a checker who checks whether the data corrected by the maker is correct or not). The second user 523 can index the corrected data as approved data for storing the corrected data onto a digital document repository (e.g., database 512(1)) as a binary format 527 or storing the corrected data onto a document data storage (e.g., database 512(2)) as an XML format 529.

The SDCM 506 may be configured, record the data flowing from the indexing section onto a machine learning model for analyzing subsequently received digital document from the document processing block 502 and searching for defective data and suggesting the best possible match of rectified data. For example, the SDCM 506 may be configured to capture the data what a user has rectified once, and subsequently auto-rectify the data for a subsequent user, thereby eliminating recitative task of corrected the same defected data again and again. According to exemplary embodiments, the defective data may include one or more of the following data: unwanted extraction data, partial data, incomplete data, junk data, and perfect but incomplete extraction data, but the disclosure is not limited thereto (see, e.g., FIG. 7).

According to exemplary embodiments, the SDCM 406 as illustrated in FIG. 4 or the SDCM 506 as illustrated in FIG. 5 may be configured to acquire knowledge by recording partial/inaccurate data and corresponding rectified data; recording data for related fields; requesting for suggestions data; recording hit counts for suggested data, etc., but the disclosure is not limited thereto. Based on the previously recorded data, the SDCM 406, 506 may be configured to provide or predict or suggest best potential rectified data for future use or analysis. Thus, SDCM 406, 506 may also be referred to as precognition service module.

Figure 6:
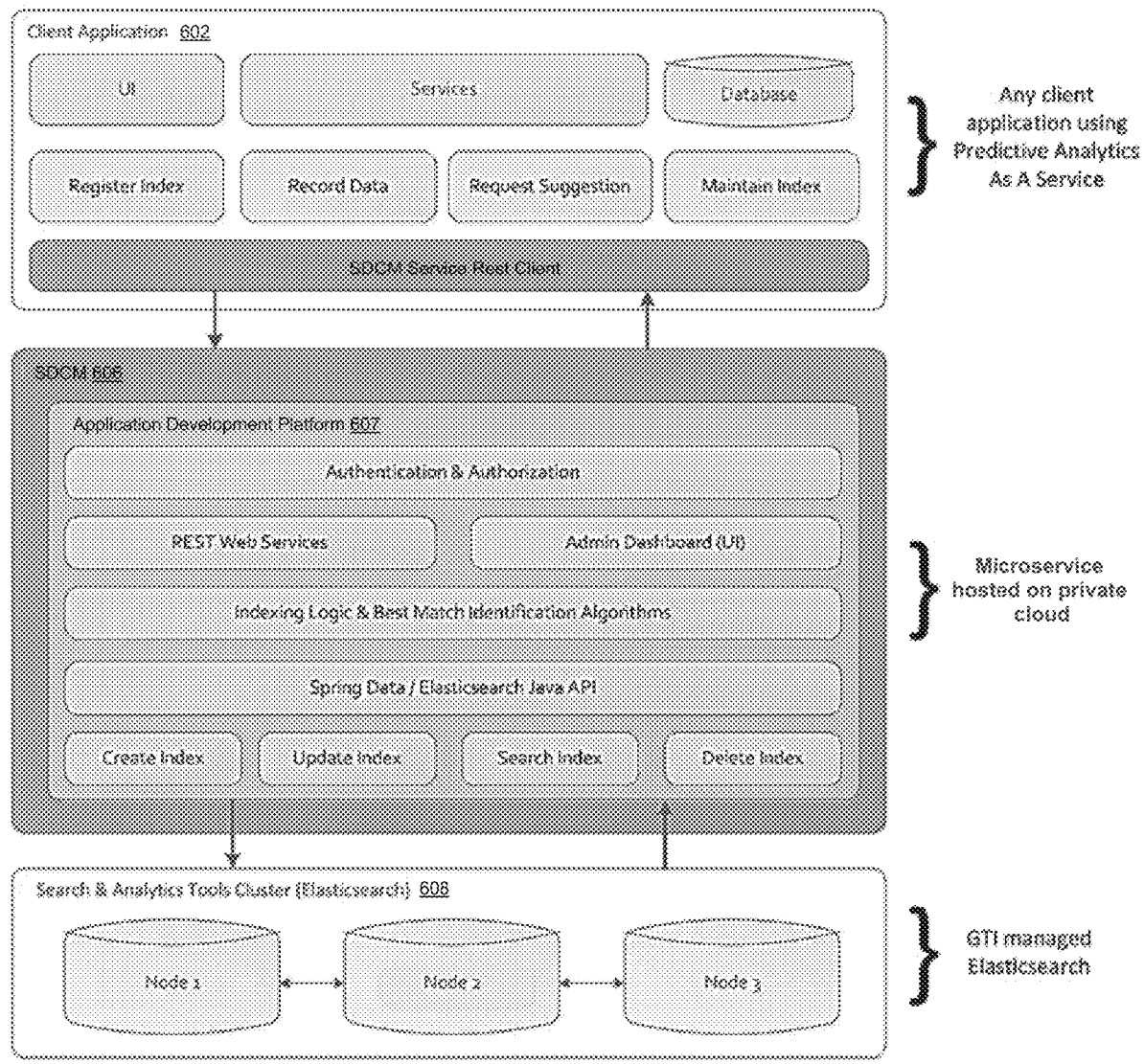
FIG. 6 illustrates an exemplary precognition service architecture implemented by the platform and language agnostic smart data capture module of FIGS. 4 and 5 in accordance with an exemplary embodiment.

FIG. 6 illustrates an exemplary precognition service architecture 600 implemented by the SDCM 406, 506. The precognition service architecture 600 may include three components: client application 602, SDCM 606, and a search and analytics tools cluster 608.

According to exemplary embodiments, the client application 602 of the precognition service architecture 600 may be any client application using predictive analytics as a service. The client application 602 may include the following blocks to perform associated function: user interface (e.g., GUI 436 as illustrated in FIG. 4); services; database; register index, record data, request suggestion, maintain index, SDCM service REST client, etc., but the disclosure is not limited thereto.

According to exemplary embodiments, the SDCM 606 (i.e., precognition service module) may include an application development platform 607 (i.e., Spring Boot). The application development platform 607 may implement authentication and authorization of users; REST Web services; administrative dashboard (i.e., user interface (UI)), indexing logic and best match identification algorithms; elastic search Java API; create index update index; search index; and delete index, etc., but the disclosure is not limited thereto. According to exemplary embodiments, the SDCM 606 may also include the modules as illustrated in SDCM 406 in FIG. 4. Each component of the SDCM 606 including the application development platform 607 maybe a corresponding microservice hosted on a private cloud.

The search and analytics tools cluster (elastic search) 608 may include a database for storing node 1 data, a database for storing node 2 data, and a database for node 3 data, wherein each database can bi-directionally communicate with each other for data exchange. According to exemplary embodiments, the search and analytics tools cluster (elastic search) 608 may be configured to provide GTI (Global Technology Infrastructure) managed elastic search, but the disclosure is not limited thereto.

Figure 7:
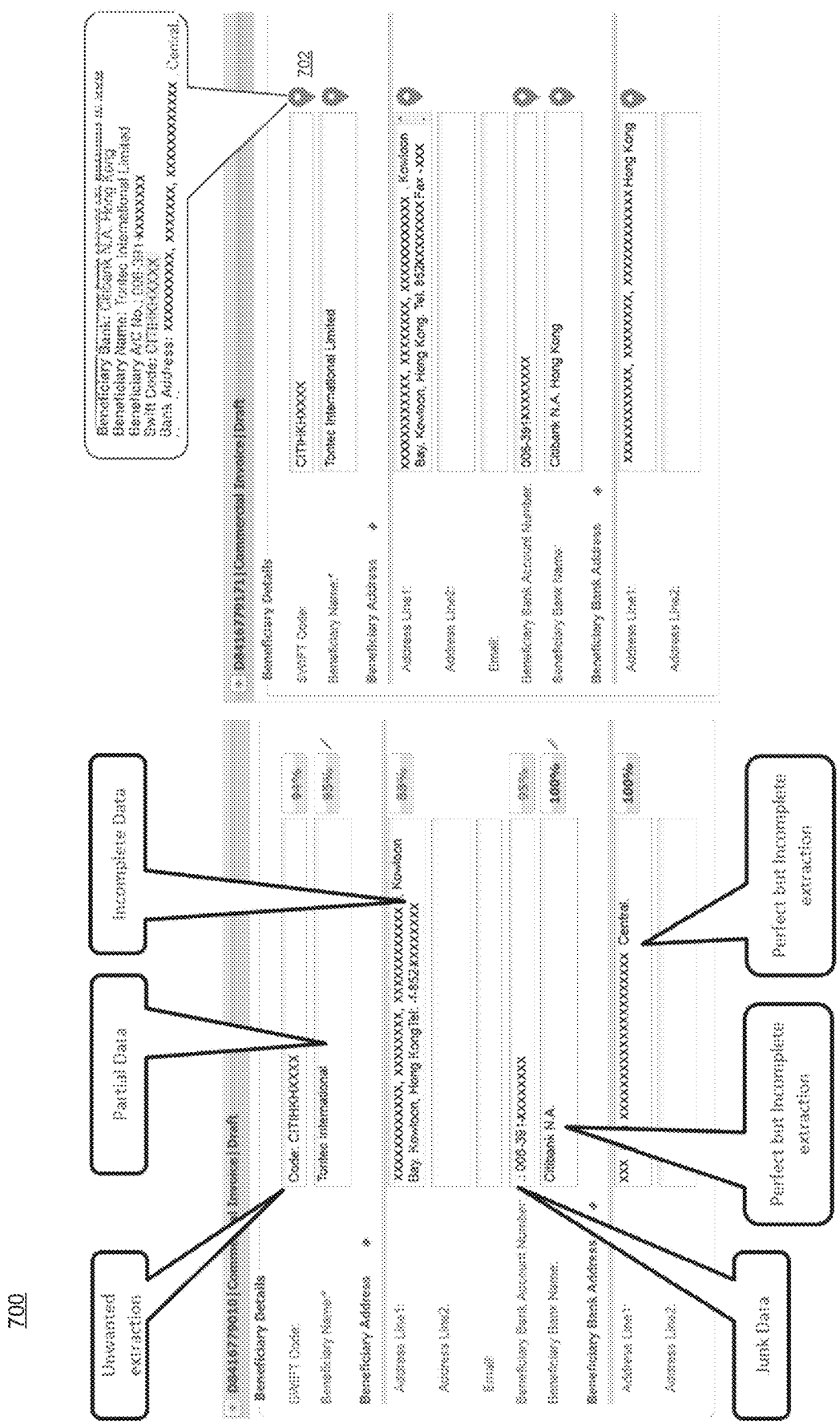
FIG. 7 illustrates an exemplary screen shot that illustrates an auto rectification algorithm implemented by the platform and language agnostic smart data capture module of FIGS. 4, 5, and 6 in accordance with an exemplary embodiment.

FIG. 7 illustrates an exemplary screen 700 that illustrates an auto rectification algorithm implemented by the SDCM 406, 506, 606.

As illustrated in FIG. 7, before rectification, junk, unwanted, and partial data may be extracted due to poor image quality. A user can manually repair the data and submit the data to a machine learning model. The machine learning model learns for the first time and records user approved data. The recorded data may then be applied to next document with best potential match. Thus, on subsequent documents submitted for extraction, recorded is applied and shown on the screen 700, e.g., by highlighting the auto-corrected fields. A user can hover over on icon 702 to easily compare and validate with the original submitted image (e.g., .PDF document).

Figure 8:
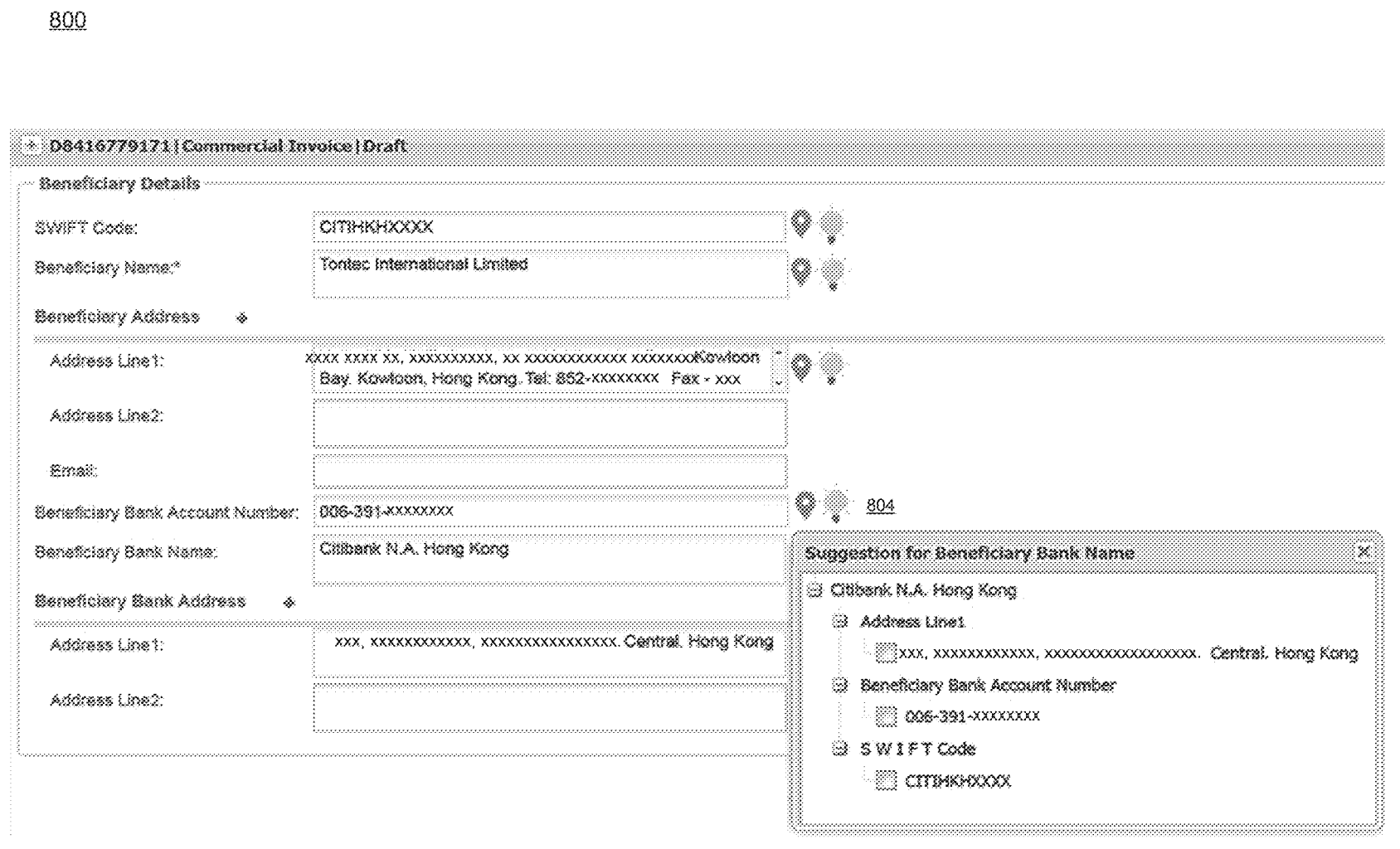

FIG. 8 illustrates an exemplary screen 800 that illustrates an auto suggestion algorithm implemented by the SDCM 406, 506, 606. According to exemplary embodiments, if auto-rectified value is not correct, auto-suggest algorithm implemented by the SDCM 406, 506, 606 helps reduce user input and maintain data consistency. For example, best potential matches are suggested to users based on historical patterns by clicking icon 804. If potential match is not available, user can over-write auto-rectified values in text box which may be again recorded by the SDCM 406, 506, 606 after user submission (i.e., continuous learning).

Figure 9:
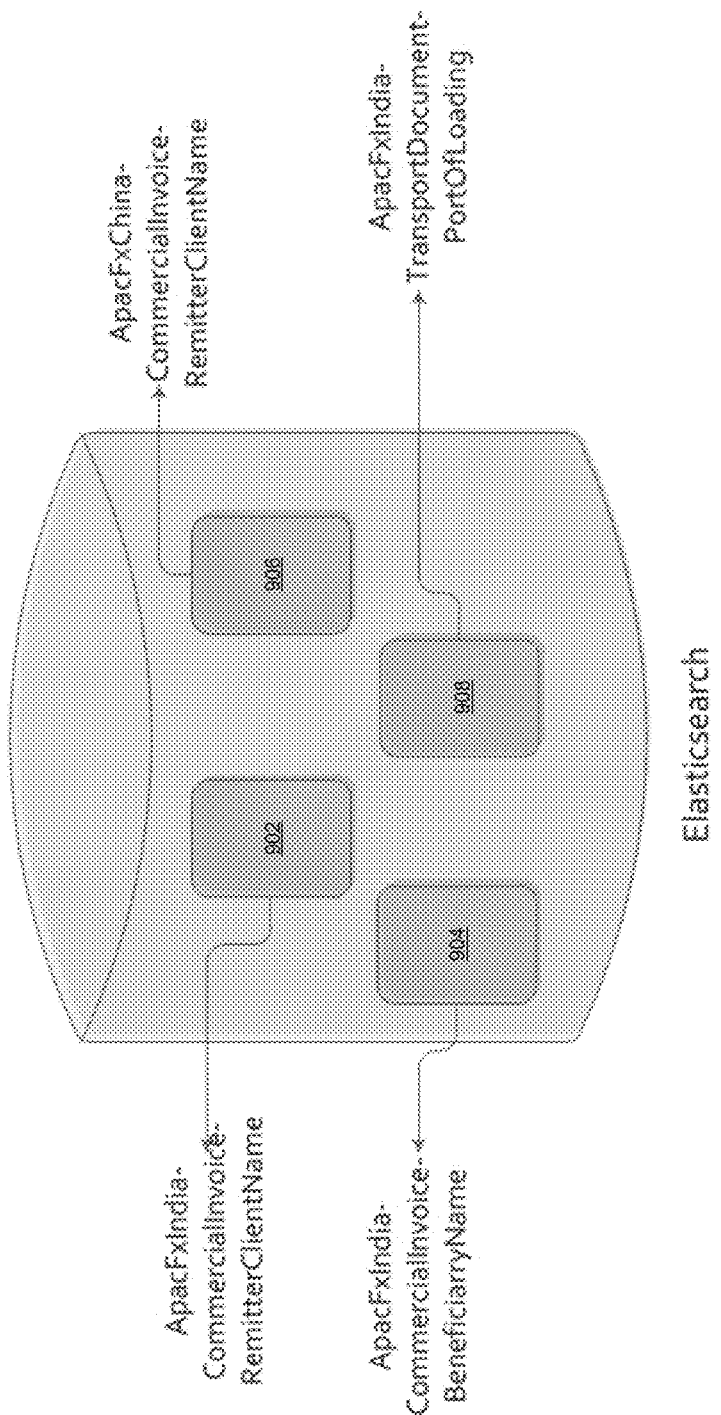
FIG. 9 illustrates an exemplary use case for elastic search on how the data may be recorded in accordance with an exemplary embodiment.

FIG. 9 illustrates an exemplary use case 900 for elastic search on how the data may be recorded. According to exemplary embodiments, data may be recorded at a field level. For example, index to store the rectified data may be unique for a field of a title and for corresponding application, region and group. It may be similar to a package name in Java. In this exemplary use case 900, index 902 is created for the remitter client name, for the context commercial invoice, for the context ApacFx India. Similarly, index 904 is created is created for the beneficiary name, for the context commercial invoice, for the context ApacFx India; index 906 is created for the remitter client name, for the context commercial invoice, for the context ApacFx China; index 908 is created for the port of loading, for the transport document, for the context ApacFx India, etc., but the disclosure is not limited to this use case.

Thus, the various aspects, embodiments, features, and/or sub-components may provide optimized processes of implementing the 406, 506, 606 that may be configured to: provide contextual suggestions at a field level (i.e., suggestions for data auto rectification are specific to context and is provided at field level); and provide collaborative suggestions for a field (i.e., when a field is not extracted or not known to the user than the data can be predicted based on the related fields), etc., but the disclosure is not limited thereto. Thus, the 406, 506, 606 that may be configured to achieve faster search compared to conventional techniques because search can be targeted to a single index, thereby resulting in a quick turnaround time.

According to exemplary embodiments, a generic JSON format may be used to record data for any field. Parameters like hit-count, last-update-time may also be recorded to provide predictions based on Most Frequently Used and Most Recently Used algorithms.

For a field that gets recorded for prediction, the following parameters may be indexed by the SDCM 406, 506, 606: rectified value, below threshold value, and data for related fields.

According to exemplary embodiments, the rectified value may be indexed only one instance. For example, when extracted value "COGNIZANT TECHNOLOGY SOLUTIONS INDIA PRIVATE LIMITED" is replaced with rectified value "Cognizant Technology Solutions India Private Limited."

According to exemplary embodiments, values for which match percentage is below 10%-15% are MAPPED to rectified value (e.g., Extracted Value: 17, B-20&A-335, Tambaram; User Verified Value: Cognizant Technology Solutions India Pvt Ltd; Match Percentage: 11.4%).

According to exemplary embodiments, values for which match percentage is high are NOT indexed (e.g., Extracted Value: COGNIZANT TECHNOLOGY SOLUTIONSINDIA PKIVA1 E LIMITED (; User Verified Value: COGNIZANT TECHNOLOGY SOLUTIONSINDIA PRIVATE LIMITED; Match Percentage: 88.9%).

According to exemplary embodiments, rectified data for fields related to field recorded is stored to provide collaborative prediction (e.g., Beneficiary Name: Cognizant Technology Solution India Private Limited; Beneficiary Bank Name: Citi Bank India Branch; Beneficiary Bank Account Number: 12XXXX-XXX-XXX-89).

The following descriptions will be provided by referring to FIGS. 4-9.

According to exemplary embodiments, the communication network 410 and the communication module 434 may be configured to establish a link between the database(s) 412, the client devices 408(1)-408(n) and the SDCM 406, 506, 606.

According to exemplary embodiments, the receiving module 414 may be configured to receive a digital document from the document processing block 502 of FIG. 5. The applying module 416 may be configured to apply an OCR algorithm on said received digital document by utilizing the data processing section 505 of FIG. 5 which may include an OCR tool.

According to exemplary embodiments, the SDCM 406 may be configured to capture data through the GUI 436 (i.e., data manually input by a user) or through a system using OCR tools, but the disclosure is not limited thereto. For example, according to exemplary embodiments, the SDCM 406 may be configured to capture data through both GUI 436 (i.e., data manually input by a user) and through a system using the OCR tools.

According to exemplary embodiments, the identifying module 418 may be configured to identify defective data (i.e., unwanted extraction data, partial data, incomplete data, junk data, and perfect but incomplete extraction data, as illustrated in the screen 700 of FIG. 7, but the disclosure is not limited thereto) extracted by the OCR tool resulted from relatively inferior image quality of the received digital document. The implementing module 420 may be configured to implement an auto rectification algorithm (i.e., by utilizing the auto rectification section 513 of FIG. 5) on the identified defective data.

According to exemplary embodiments, the generating module 422 may be configured to automatically generate, in response to implementing the auto rectification algorithm, corresponding auto-rectified data for each identified defective data. The recording module 424 may be configured to record the defective data and corresponding auto-rectified data at a field level. A rectified value list may also be generated.

According to exemplary embodiments, in generating initial auto-rectified field data onto the GUI 436, the comparing module 430 may be configured to compare the auto-rectified field data with a corresponding original image data of the digital document; and the validating module 432 may be configured to validate, in response to comparing by the comparing module 430, the auto-rectified field data based on a determination that a result data of comparing the auto-rectified field data with the corresponding original image data is within a predetermined threshold.

According to exemplary embodiments, the receiving module 414 may be configured to receive user input data on said recorded auto-rectified data. The determining module 426 may be configured to determine whether the auto-rectified data is correct or not. The populating module 428 may be configured to populate, based on determining by the determining module 426 that the auto-rectified data is correct, a machine learning model with the received user input data to be utilized for analyzing subsequently received digital document and searching for defective data and suggesting the best possible match of rectified data on the GUI 436.

According to exemplary embodiments, the generating module 422 may be configured to generate a plurality of first selectable icons (i.e., icons 702 as illustrated in FIG. 7), wherein each of the first selectable icon 702 may be configured to display corresponding auto-rectified field data when user input is received by clicking or hovering over the first selectable icon 702. The receiving module 414 may be further configured to receive user input data that the auto-rectified field data is not correct based on user's comparison of the auto-rectified field data with a corresponding original image data of the digital document. The receiving module 414 may be further configured to receive user input data indicating a user defined correct field data replacing the auto-rectified field data.

According to exemplary embodiments, the receiving module 424 may be configured to receive user input data indicating approval of the auto-rectified field data when a difference between an auto-rectified data value and user input data value is equal to or more than the predetermined threshold value.

According to exemplary embodiments, the receiving module 424 may be configured to receive user input data indicating disapproval of the auto-rectified field data when a difference between an auto-rectified data value and user input data value is below the predetermined threshold value.

According to exemplary embodiments, the generating module 422 may be further configured to generate a plurality of second selectable icons (e.g., icons 804 as illustrated in FIG. 8). Each of the second selectable icon 804 may be configured to display, upon receiving user input via clicking or hovering over the second selectable icon 804, corresponding suggested potential match field data for a corresponding disapproval of the auto-rectified field data based on historical patterns data that was generated previously in correcting the disapproved auto-rectified field data. The receiving module 414 may be further configured to receive user input in approving the suggested potential match field data; and the populating module 428 may be configured to populate the machine learning model with the approved suggested potential match field data to be utilized for subsequently received digital document for analyzing the subsequently received digital document and searching for defective data and automatically suggesting the best possible match of rectified data on the GUI 436.

According to exemplary embodiments, when suggested potential match field data is not available for a certain extracted and user populated data, the receiving module 414 may be configured to receive user input data that accepts the certain extracted or the user populated data as a new field data for subsequent suggestions; and the populating module 428 may be configured to populate the machine learning model with the new field data to be utilized for subsequently received digital document.

Figure 10A:
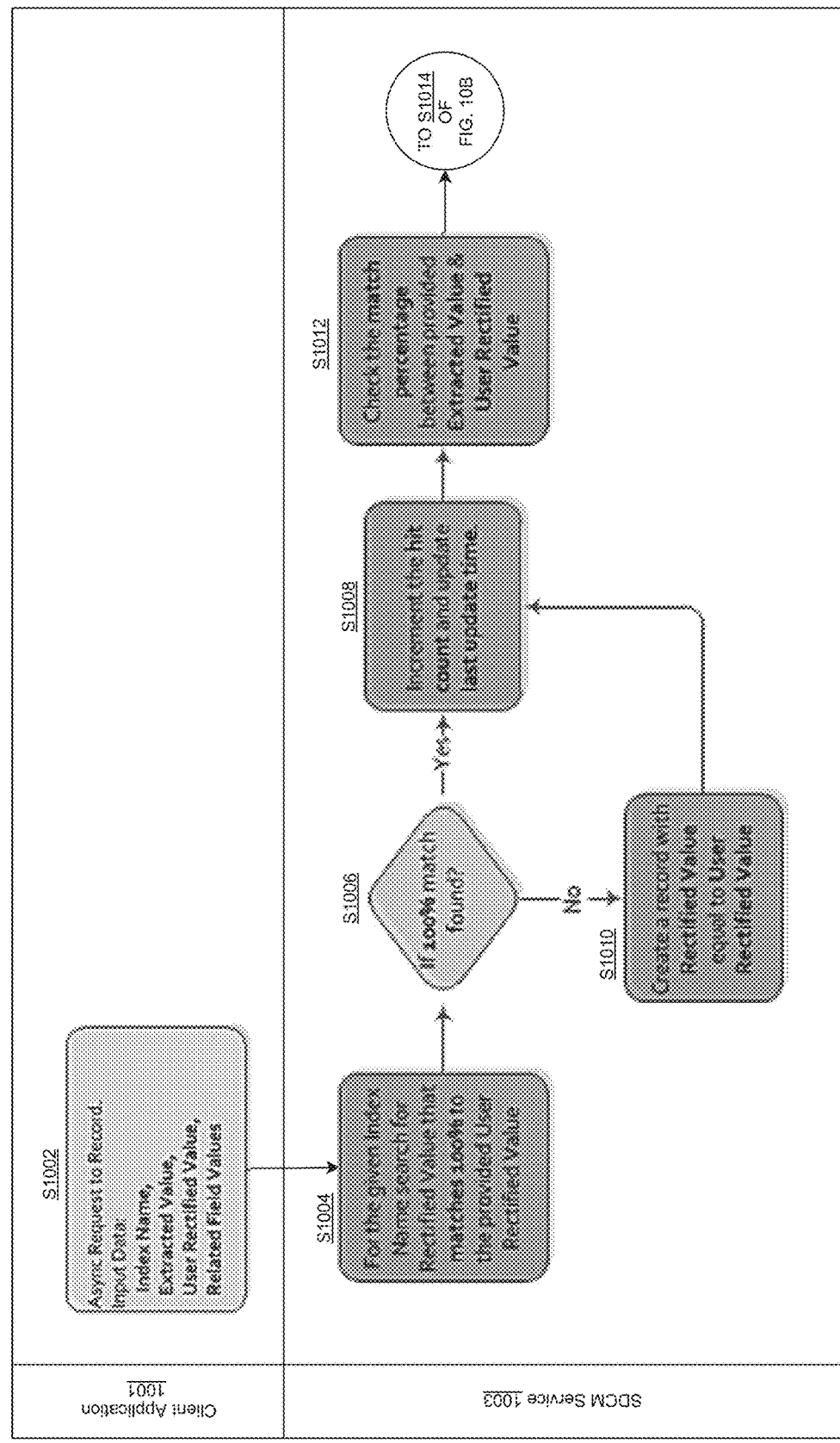
FIG. 10A and FIG. 10B, in combination, illustrate an exemplary flow of a process of a use case on how data gets recorded in accordance with an exemplary embodiment.
Figure 10B:
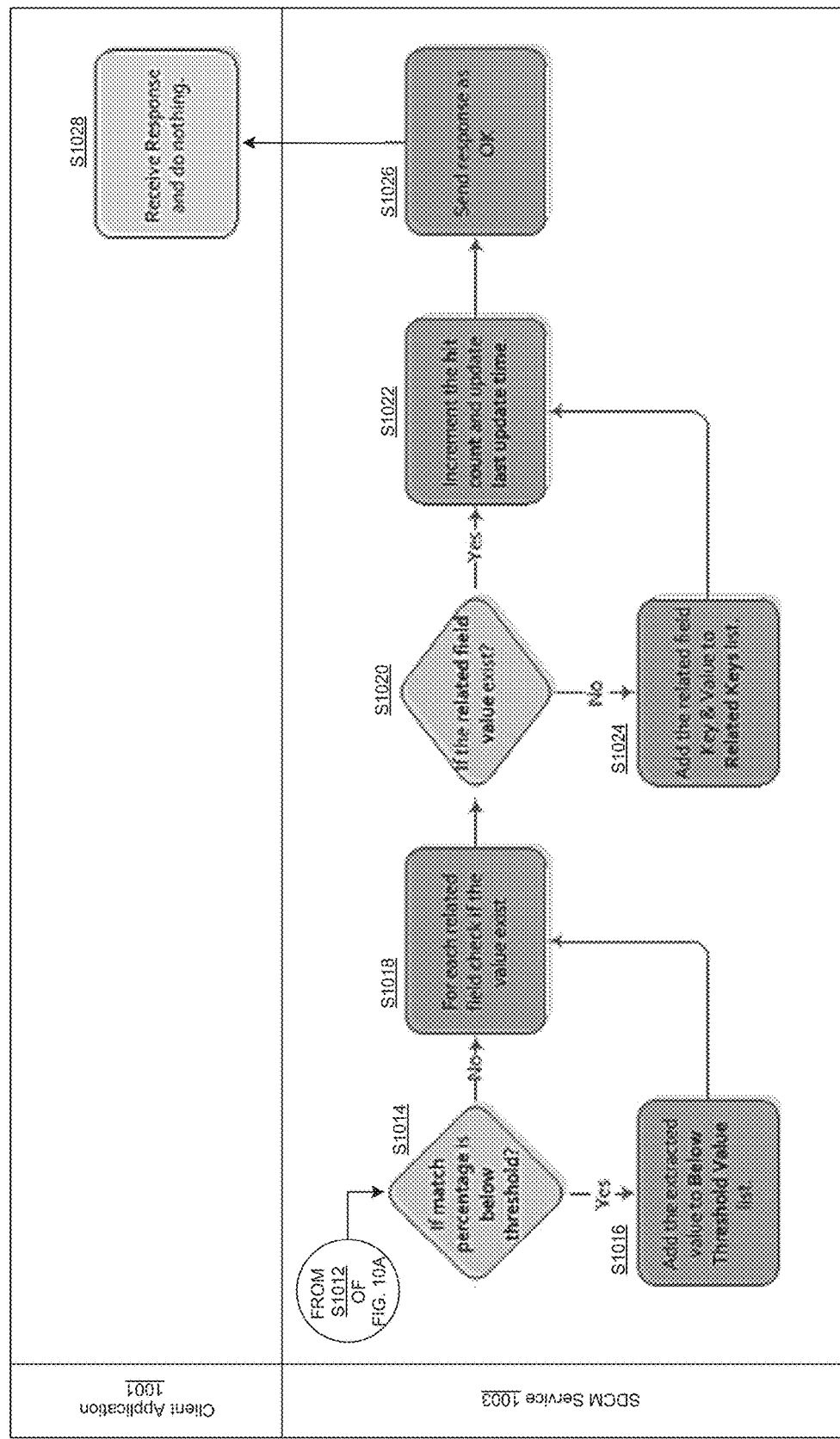

FIG. 10A and FIG. 10B, in combination, illustrate an exemplary flow of a process 1000 of a use case on how data gets recorded in accordance with an exemplary embodiment. It will be appreciated that the illustrated process 1000 and associated steps may be performed in a different order, with illustrated steps omitted, with additional steps added, or with a combination of reordered, combined, omitted, or additional steps.

According to exemplary embodiments, at step S1002 of the process 1000, a client application 1001 may request to record input data, e.g., index name, extracted value, user rectified value, related field values, etc., but the disclosure is not limited thereto.

At step S1004 of the process 1000, an SDCM service 1003 may search, for the given index name, for rectified value that matches 100% to the provided user rectified value. At step S1006 of the process 1000, an SDCM service 1003 may determine whether there is 100% match found. If the answer is yes, at step S1008 of the process 1000, the SDCM service 1003 may increment the hit count of the matched data and update last update time and then the process 1000 flows to step S1012 where the SDCM service 1003 may check the match percentage between provided extracted value and user rectified value. If the answer is no, at step S1010 of the process 1000, the SDCM service 1003 may create a record with rectified value equal to user rectified value and the process 1000 flows to step S1012 where the SDCM service 1003 checks the match percentage between provided extracted value and user rectified value.

According to exemplary embodiments, at step S1014 of the process 1000, the SDCM service 1003 may determine whether match percentage is below a threshold. If the answer is yes, at step S1016 of the process 1000, the SDCM service 1003 may add the extracted value to a "below threshold value," and the process 1000 flows to S1018 where the SDCM service 1003 may check, for each related field, whether the value exists. If the answer at step S1014 is no, the process 1000 also flows to S1018 where the SDCM service 1003 may check, for each related field, whether the value exists.

According to exemplary embodiments, at step S1020 of the process 1000, the SDCM service 1003 may determine whether related field value exists. If the answer is yes, at step S1022 of the process 1000, the SDCM service 1003 may increment the hit count and update last update time. If the answer at step S1020 is no, at step S1024 of the process 1000, the SDCM service 1003 may add the related field key and value to a "related keys" list, and then the process 1000 flows to step S1022 where the SDCM service 1003 may increment the hit count and update last update time.

According to exemplary embodiments, at step S1026 of the process, the SDCM service 1003 may send response as acceptable (i.e., send response as okay), and then at step S1028 of the process 1000, the client application 1001 may receive respond and the process ends.

Figure 11:
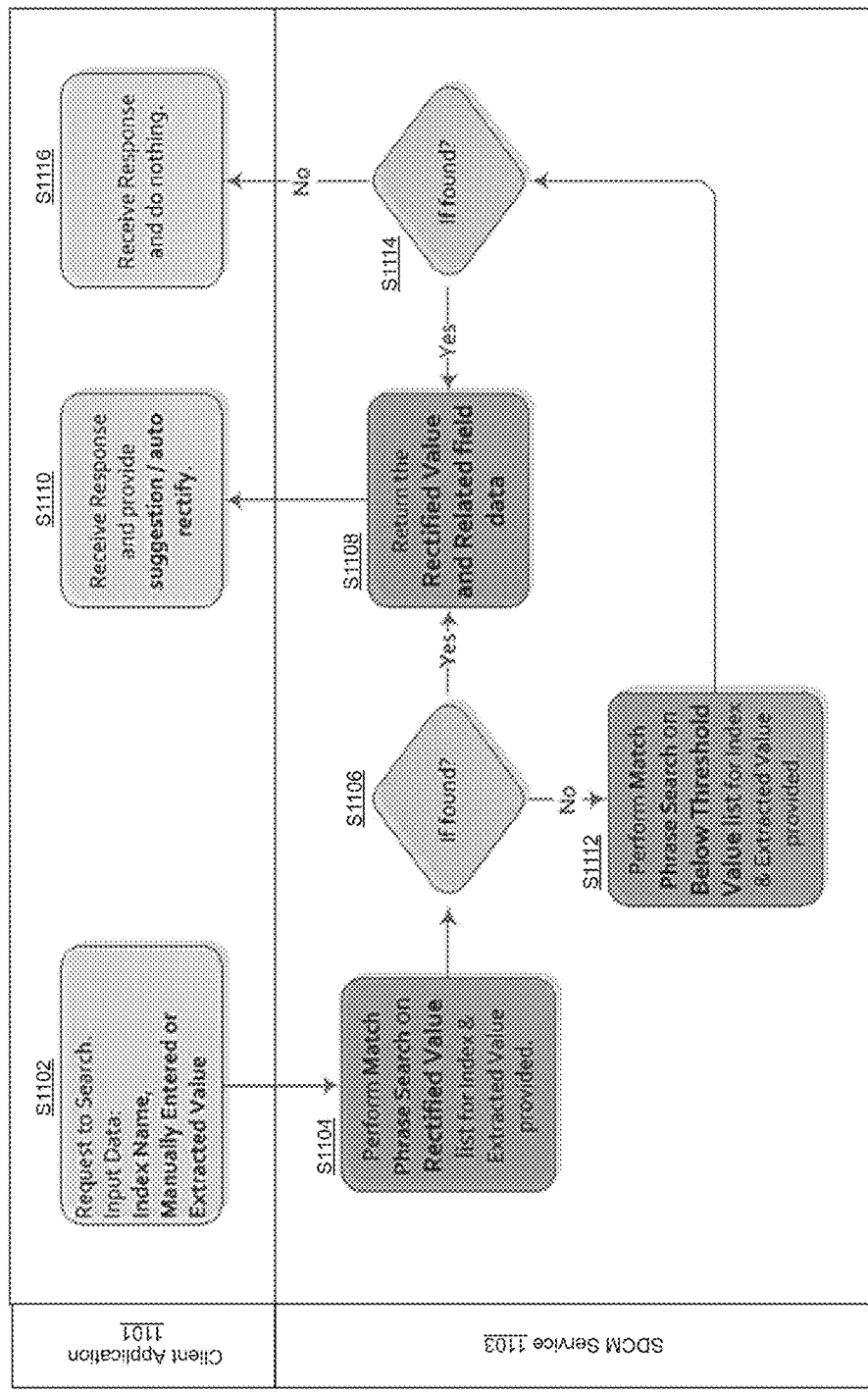
FIG. 11 illustrates an exemplary flow of a process of a use case on how data gets suggested in accordance with an exemplary embodiment.

FIG. 11 illustrates an exemplary flow of a process 1100 of a use case on how data gets suggested in accordance with an exemplary embodiment. It will be appreciated that the illustrated process 1100 and associated steps may be performed in a different order, with illustrated steps omitted, with additional steps added, or with a combination of reordered, combined, omitted, or additional steps.

According to exemplary embodiments, at step S1102 of the process 1100, a client application 1101 may request to search input data, e.g., index name, manually entered or extracted value, etc., but the disclosure is not limited thereto.

At step S1104 of the process 1100, an SDCM service 1103 may perform match phrase search on a "rectified value list" for index and extracted value provided therein. At step S1106 of the process 1100, an SDCM service 1103 may determine whether there is a match found. If the answer is yes at step S1106, at step S1108 of the process 1100, the SDCM service 1103 may return the rectified value and related field data and then the process 1100 flows to step S1110 where the client application 1101 may receive response and provide suggestion or automatically rectify the field data. If the answer is no at step S1106, at step S1112 of the process 1100, the SDCM service 1103 may perform match phrase search on a "below threshold value list" for index and extracted value provided therein, and then the process 1100 flows to step S1114 where it is determined whether a match is found. If the answer is yes at step S1114, the process 1100 flows to step S1108 again where the SDCM service 1103 may return the rectified value and related field data. If, however, the answer is no at step S1114, the process 1100 flows to step S1116 where the client application 1101 may receive the response of no match found and ends the process.

Figure 12:
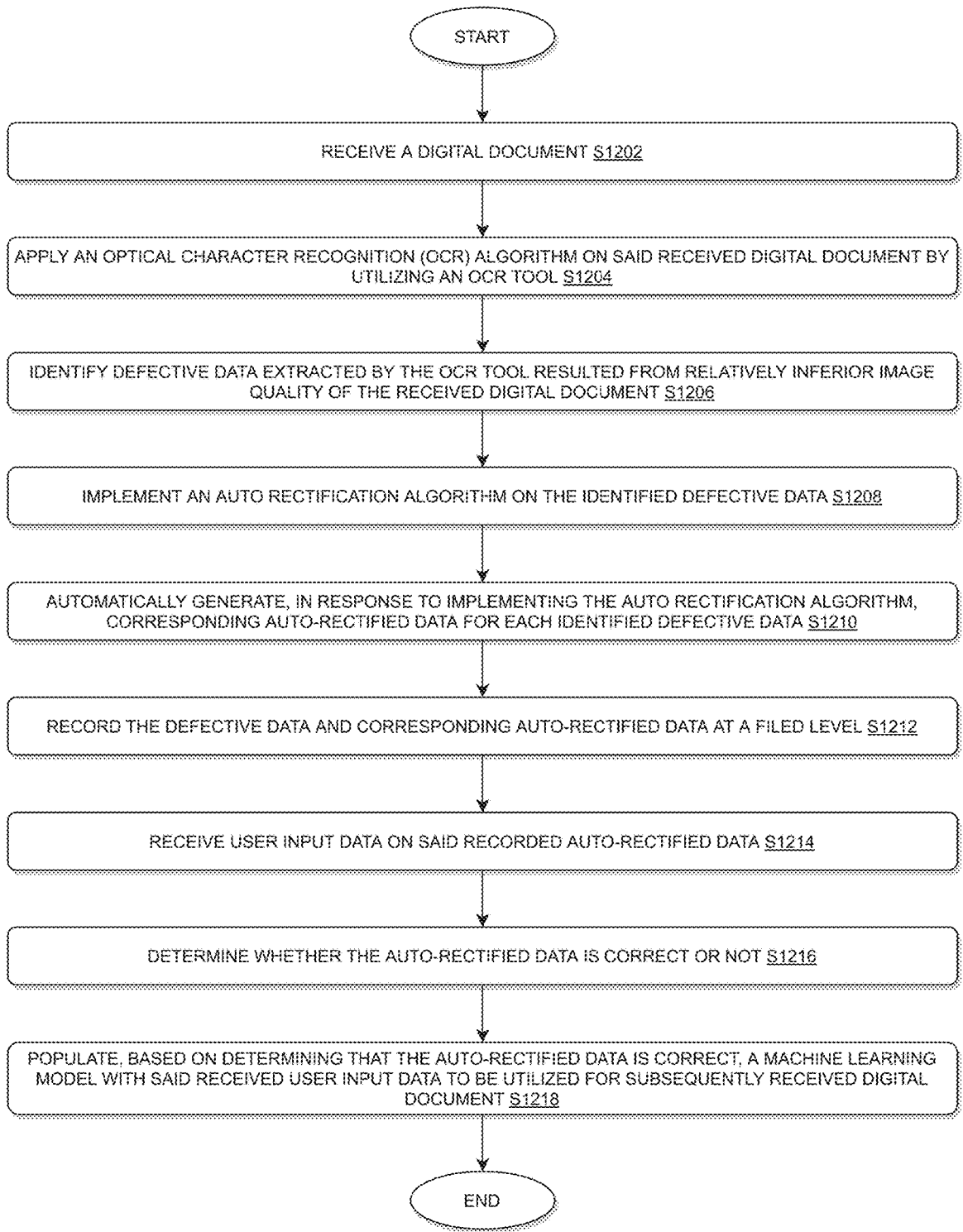
FIG. 12 illustrates a flow chart for implementing a platform and language agnostic smart data capture module that is configured to generate/suggest/display best potential rectified data based on past recordings of data in accordance with an exemplary embodiment.

FIG. 12 illustrates a flow chart of a process 1200 for implementing a platform and language agnostic smart data capture module for generating, suggesting, and displaying best potential rectified data based on past recordings of data in accordance with an exemplary embodiment. It will be appreciated that the illustrated process 1200 and associated steps may be performed in a different order, with illustrated steps omitted, with additional steps added, or with a combination of reordered, combined, omitted, or additional steps.

As illustrated in FIG. 12, at step S1202, the process 1200 may include receiving a digital document. The digital document may be received from a plurality of sources, e.g., uploaded from a website, received from electronic medium (e.g., email, texts, fax, etc., but the disclosure is not limited thereto), received via mail or courier service, etc. but the disclosure is not limited thereto.

At step S1204, the process 1200 may include applying an OCR algorithm on the received digital document by utilizing an OCR tool.

At step S1206, the process 1200 may include identifying defective data that was extracted by the OCR tool and resulted from relatively inferior image quality of the received digital document.

At step S1208, the process 1200 may include implementing an auto rectification algorithm on the identified defective data.

At step S1210, the process 1200 may include automatically generating, in response to implementing the auto rectification algorithm, corresponding auto-rectified data for each identified defective data.

At step S1212, the process 1200 may include recording the defective data and corresponding auto-rectified data at a field level.

At step S1214, the process 1200 may include receiving user input data on the recorded auto-rectified data.

At step S1216, the process 1200 may include determining whether the auto-rectified data is correct or not.

At step S1218, the process 1200 may include populating, based on determining that the auto-rectified data is correct, a machine learning model with said received user input data to be utilized for analyzing subsequently received digital document and searching for defective data and suggesting the best possible match of rectified data onto a GUI.

According to exemplary embodiments, the process 1200 may further include: generating a plurality of first selectable icons, wherein each of said first selectable icon is configured to display corresponding auto-rectified field data when user input is received by clicking or hovering over the first selectable icon; receiving user input data that the auto-rectified field data is not correct based on user's comparison of the auto-rectified field data with a corresponding original image data of the digital document; and receiving user input data indicating a user defined correct field data replacing the auto-rectified field data.

According to exemplary embodiments, the process 1200 may further include: receiving user input data indicating approval of the auto-rectified field data when a difference between an auto-rectified data value and user input data value is equal to or more than the predetermined threshold value.

According to exemplary embodiments, the process 1200 may further include: receiving user input data indicating disapproval of the auto-rectified field data when a difference between an auto-rectified data value and user input data value is below the predetermined threshold value.

According to exemplary embodiments, the process 1200 may further include: generating a plurality of second selectable icons, wherein each of said second selectable icon is configured to display, upon receiving user input via clicking or hovering over the second selectable icon, corresponding suggested potential match field data for a corresponding disapproval of the auto-rectified field data based on historical patterns data that was generated previously in correcting the disapproved auto-rectified field data; receiving user input in approving the suggested potential match field data; and populating the machine learning model with said approved suggested potential match field data to be utilized for analyzing subsequently received digital document and searching for defective data and suggesting the best possible match of rectified data onto GUI.

According to exemplary embodiments, wherein when suggested potential match field data is not available for a certain extracted or user populated data, the process 1200 may further include: receiving user input data that accepts the certain extracted or the user populated data as a new field data for subsequent suggestions; and populating the machine learning model with said new field data to be utilized for subsequently received digital document.

According to exemplary embodiments, the process 1200 may further include: providing suggestions to the users based on past recording of the user selected data; and recording the suggestion selected or rejected (by selecting or typing another value) by the user and maintaining a hit count per suggestion. With time the set of suggestion for a given field will increase and the entire list of suggestion can be ordered based on hit count (likes or dislikes).

According to exemplary embodiments, to refine the suggestion and reduce the time to identify the best potential match for users' requirement, the process 1200 may further perform a cleanup activity. For example, the process 1200 may apply a mark and sweep algorithm that may include the following, but the disclosure is not limited thereto: mark all the suggestions that have low hit counts (i.e., a predetermined threshold value) and keep them for a configurable period of time (configuration can be controlled by user); and sweep/delete all the suggestions which were marked once the configured time has passed. According to exemplary embodiments, the suggestion value gets unmarked for deletion in case it gets used for suggestion or the hit count increases above a certain threshold (threshold is configurable).

According to exemplary embodiments, a user of the SDCM 406, 506, 606 may be in full control of the data. For example, by utilizing the smart data capture module, a user can enable suggestions for a data field or n number of data field, wherein the SDCM 406, 506, 606 is configured to create a background index; reuse suggestion of one data field for other data fields; and disable the suggestions, wherein the SDCM 406, 506, 606 is configured to delete the index, etc., but the disclosure is not limited thereto.

According to exemplary embodiments, the SDCD 402 may include a memory (e.g., a memory 106 as illustrated in FIG. 1) which may be a non-transitory computer readable medium that may be configured to store instructions for implementing an SDCM 406, 506, 606 for data processing as disclosed herein. The SDCD 402 may also include a medium reader (e.g., a medium reader 112 as illustrated in FIG. 1) which may be configured to read any one or more sets of instructions, e.g., software, from any of the memories described herein. The instructions, when executed by a processor embedded within the SDCM 406, 506, 606 or within the SDCD 402, may be used to perform one or more of the methods and processes as described herein. In a particular embodiment, the instructions may reside completely, or at least partially, within the memory 106, the medium reader 112, and/or the processor 104 (see FIG. 1) during execution by the SDCD 402.

According to exemplary embodiments, the instructions, when executed, may cause a processor embedded within the SDCM 406, 506, 606 or the SDCD 402 to perform the following: receiving a digital document; applying an optical character recognition (OCR) algorithm on said received digital document by utilizing an OCR tool; identifying defective data extracted by the OCR tool resulted from relatively inferior image quality of the received digital document; implementing an auto rectification algorithm on the identified defective data; automatically generating, in response to implementing the auto rectification algorithm, corresponding auto-rectified data for each identified defective data; recording the defective data and corresponding auto-rectified data at a field level; receiving user input data on said recorded auto-rectified data; determining whether the auto-rectified data is correct or not; and populating, based on determining that the auto-rectified data is correct, a machine learning model with said received user input data to be utilized for analyzing subsequently received digital document and searching for defective data and suggesting the best possible match of rectified data onto GUI. According to exemplary embodiments, the processor may be the same or similar to the processor 104 as illustrated in FIG. 1 or the processor embedded within SDCD 202, SDCD 302, SDCD 402, and SDCM 406, 506, 606.

According to exemplary embodiments, the instructions, when executed, may cause the processor 104 to further perform the following: generating a plurality of first selectable icons, wherein each of said first selectable icon is configured to display corresponding auto-rectified field data when user input is received by clicking or hovering over the first selectable icon; receiving user input data that the auto-rectified field data is not correct based on user's comparison of the auto-rectified field data with a corresponding original image data of the digital document; and receiving user input data indicating a user defined correct field data replacing the auto-rectified field data.

According to exemplary embodiments, the instructions, when executed, may cause the processor 104 to further perform the following: receiving user input data indicating approval of the auto-rectified field data when a difference between an auto-rectified data value and user input data value is equal to or more than the predetermined threshold value.

According to exemplary embodiments, the instructions, when executed, may cause the processor 104 to further perform the following: receiving user input data indicating disapproval of the auto-rectified field data when a difference between an auto-rectified data value and user input data value is below the predetermined threshold value.

According to exemplary embodiments, the instructions, when executed, may cause the processor 104 to further perform the following: generating a plurality of second selectable icons, wherein each of said second selectable icon is configured to display, upon receiving user input via clicking or hovering over the second selectable icon, corresponding suggested potential match field data for a corresponding disapproval of the auto-rectified field data based on historical patterns data that was generated previously in correcting the disapproved auto-rectified field data; receiving user input in approving the suggested potential match field data; and populating the machine learning model with said approved suggested potential match field data to be utilized for analyzing subsequently received digital document and searching for defective data and suggesting the best possible match of rectified data onto a GUI.

According to exemplary embodiments, wherein when suggested potential match field data is not available for a certain extracted or user populated data, the instructions, when executed, may cause the processor 104 to further perform the following: receiving user input data that accepts the certain extracted or the user populated data as a new field data for subsequent suggestions; and populating the machine learning model with said new field data to be utilized for subsequently received digital document.

According to exemplary embodiments, the processor 104 may be further configured to: provide suggestions to the users based on past recording of the user selected data; and record the suggestion selected or rejected (by selecting or typing another value) by the user and maintaining a hit count per suggestion. With time the set of suggestion for a given field will increase and the entire list of suggestion can be ordered based on hit count (likes or dislikes).

According to exemplary embodiments, to refine the suggestion and reduce the time to identify the best potential match for users' requirement, the processor 104 may further perform a cleanup activity. For example, the processor 104 may apply a mark and sweep algorithm that may include the following, but the disclosure is not limited thereto: mark all the suggestions that have low hit counts (i.e., a predetermined threshold value) and keep them for a configurable period of time (configuration can be controlled by user); and sweep/delete all the suggestions which were marked once the configured time has passed. According to exemplary embodiments, the suggestion value gets unmarked for deletion in case it gets used for suggestion or the hit count increases above a certain threshold (threshold is configurable).

According to exemplary embodiments as disclosed above in FIGS. 1-12, technical improvements effected by the instant disclosure may include a platform for implementing a platform and language agnostic data capture module that is configured to generate/suggest best potential rectified data based on past recordings of data, but the disclosure is not limited thereto.

For example, according to exemplary embodiments as disclosed above in FIGS. 1-12, technical improvements effected by the instant disclosure may include a platform that may also provide optimized processes of implementing a platform and language agnostic smart data capture module that is configured to: provide contextual suggestions at a field level (i.e., suggestions for data auto rectification are specific to context and is provided at field level); and provide collaborative suggestions for a field (i.e., when a field is not extracted or not known to the user than the data can be predicted based on the related fields), etc., but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for data processing by utilizing one or more processors along with allocated memory, the method comprising:
   receiving a digital document;
   applying an optical character recognition (OCR) algorithm on said received digital document by utilizing an OCR tool;
   identifying defective data extracted by the OCR tool resulted from relatively inferior image quality of the received digital document;
   implementing an auto rectification algorithm on the identified defective data;
   automatically generating, in response to implementing the auto rectification algorithm, corresponding auto-rectified data for each identified defective data;
   recording the defective data and corresponding auto-rectified data at a field level;
   receiving user input data on said recorded auto-rectified data;
   determining whether the auto-rectified data is correct or not;
   populating, based on determining that the auto-rectified data is correct, a machine learning model with said received user input data to be utilized for subsequently received digital document;
   generating a plurality of first selectable icons, wherein each of said first selectable icon is configured to display corresponding auto-rectified field data when user input is received by clicking or hovering over the first selectable icon;
   receiving user input data that the auto-rectified field data is not correct based on user's comparing comparison of the auto-rectified field data with a corresponding original image data of the digital document; and
   receiving user input data indicating a user defined correct field data replacing the auto-rectified field data.

2. The method according to claim 1, wherein the defective data includes one or more of the following data: unwanted extraction data, partial data, incomplete data, junk data, and perfect but incomplete extraction data.

3. The method according to claim 1, further comprising:
   receiving user input data indicating approval of the auto-rectified field data when a difference between an auto-rectified data value and user input data value is equal to or more than a predetermined threshold value.

4. The method according to claim 1, further comprising:
   receiving user input data indicating disapproval of the auto-rectified field data when a difference between an auto-rectified data value and user input data value is below a predetermined threshold value.

5. The method according to claim 4, further comprising:
   generating a plurality of second selectable icons, wherein each of said second selectable icon is configured to display, upon receiving user input via clicking or hovering over the second selectable icon, corresponding suggested potential match field data for a corresponding disapproval of the auto-rectified field data based on historical patterns data that was generated previously in correcting the disapproved auto-rectified field data;
   receiving user input in approving the suggested potential match field data; and
   populating the machine learning model with said approved suggested potential match field data to be utilized for subsequently received digital document.

6. The method according to claim 5, wherein when suggested potential match field data is not available for a certain extracted or user populated data, the method further comprising:
   receiving user input data that accepts the certain extracted or the user populated data as a new field data for subsequent suggestions; and
   populating the machine learning model with said new field data to be utilized for subsequently received digital document.

7. A system for data processing, the system comprising:
   a processor; and
   a memory operatively connected to the processor via a communication interface, the memory storing computer readable instructions, when executed, causes the processor to:
   receive a digital document;
   apply an optical character recognition (OCR) algorithm on said received digital document by utilizing an OCR tool;
   identify defective data extracted by the OCR tool resulted from relatively inferior image quality of the received digital document;
   implement an auto rectification algorithm on the identified defective data;
   automatically generate, in response to implementing the auto rectification algorithm, corresponding auto-rectified data for each identified defective data;
   record the defective data and corresponding auto-rectified data at a field level;
   receive user input data on said recorded auto-rectified data;
   determine whether the auto-rectified data is correct or not;
   populate, based on determining that the auto-rectified data is correct, a machine learning model with said received user input data to be utilized for subsequently received digital document;
   generate a plurality of first selectable icons, wherein each of said first selectable icon is configured to display corresponding auto-rectified field data when user input is received by clicking or hovering over the first selectable icon;
   receive user input data that the auto-rectified field data is not correct based on user's comparing comparison of the auto-rectified field data with a corresponding original image data of the digital document; and
   receive user input data indicating a user defined correct field data replacing the auto-rectified field data.

8. The system according to claim 7, wherein the defective data includes one or more of the following data: unwanted extraction data, partial data, incomplete data, junk data, and perfect but incomplete extraction data.

9. The system according to claim 7, wherein the processor is further configured to:
   receive user input data indicating approval of the auto-rectified field data when a difference between an auto-rectified data value and user input data value is equal to or more than a predetermined threshold value.

10. The system according to claim 7, wherein the processor is further configured to:
    receive user input data indicating disapproval of the auto-rectified field data when a difference between an auto-rectified data value and user input data value is below a predetermined threshold value.

11. The system according to claim 10, wherein the processor is further configured to:
  generate a plurality of second selectable icons, wherein each of said second selectable icon is configured to display, upon receiving user input via clicking or hovering over the second selectable icon, corresponding suggested potential match field data for a corresponding disapproval of the auto-rectified field data based on historical patterns data that was generated previously in correcting the disapproved auto-rectified field data;
  receive user input in approving the suggested potential match field data; and
  populate the machine learning model with said approved suggested potential match field data to be utilized for subsequently received digital document.

12. The system according to claim 11, wherein when suggested potential match field data is not available for a certain extracted or user populated data, the processor is further configured to:
  receive user input data that accepts the certain extracted or the user populated data as a new field data for subsequent suggestions; and
  populate the machine learning model with said new field data to be utilized for subsequently received digital document.

13. A non-transitory computer readable medium configured to store instructions for data processing, wherein, when executed, the instructions cause a processor to perform the following:
  receiving a digital document;
  applying an optical character recognition (OCR) algorithm on said received digital document by utilizing an OCR tool;
  identifying defective data extracted by the OCR tool resulted from relatively inferior image quality of the received digital document;
  implementing an auto rectification algorithm on the identified defective data;
  automatically generating, in response to implementing the auto rectification algorithm, corresponding auto-rectified data for each identified defective data;
  recording the defective data and corresponding auto-rectified data at a field level;
  receiving user input data on said recorded auto-rectified data;
  determining whether the auto-rectified data is correct or not;
  populating, based on determining that the auto-rectified data is correct, a machine learning model with said received user input data to be utilized for subsequently received digital document;
  generating a plurality of first selectable icons, wherein each of said first selectable icon is configured to display corresponding auto-rectified field data when user input is received by clicking or hovering over the first selectable icon;
  receiving user input data that the auto-rectified field data is not correct based on user's comparing comparison of the auto-rectified field data with a corresponding original image data of the digital document; and
  receiving user input data indicating a user defined correct field data replacing the auto rectified field data.

14. The non-transitory computer readable medium according to claim 13, wherein the defective data includes one or more of the following data: unwanted extraction data, partial data, incomplete data, junk data, and perfect but incomplete extraction data.

15. The non-transitory computer readable medium according to claim 13, wherein the instructions, when executed, cause the processor to further perform the following:
  receiving user input data indicating approval of the auto-rectified field data when a difference between an auto-rectified data value and user input data value is equal to or more than a predetermined threshold value.

16. The non-transitory computer readable medium according to claim 13, wherein the instructions, when executed, cause the processor to further perform the following:
  receiving user input data indicating disapproval of the auto-rectified field data when a difference between an auto-rectified data value and user input data value is below a predetermined threshold value.

17. The non-transitory computer readable medium according to claim 16, wherein the instructions, when executed, cause the processor to further perform the following:
  generating a plurality of second selectable icons, wherein each of said second selectable icon is configured to display, upon receiving user input via clicking or hovering over the second selectable icon, corresponding suggested potential match field data for a corresponding disapproval of the auto-rectified field data based on historical patterns data that was generated previously in correcting the disapproved auto-rectified field data;
  receiving user input in approving the suggested potential match field data; and
  populating the machine learning model with said approved suggested potential match field data to be utilized for subsequently received digital document.

18. The non-transitory computer readable medium according to claim 17, wherein when suggested potential match field data is not available for a certain extracted or user populated data, the instructions, when executed, cause the processor to further perform the following:
  receiving user input data that accepts the certain extracted or the user populated data as a new field data for subsequent suggestions; and
  populating the machine learning model with said new field data to be utilized for subsequently received digital document.

* * * * *